US012641448B2

(12) United States Patent
Angarita et al.

(10) Patent No.: US 12,641,448 B2
(45) Date of Patent: May 26, 2026

(54) SYMBOL BOUNDARY DETECTION

(71) Applicant: Nordic Semiconductor ASA, Trondheim (NO)

(72) Inventors: Fabian Angarita, Trondheim (NO); Thomas Bridge, Farnham (GB); Sriram Kankipati, Hyderabad (IN); Murat Badem, Farnham (GB)

(73) Assignee: Nordic Semiconductor ASA, Trondheim (NO)

( * ) Notice: Subject to any disclaimer, the term of this patent is extended or adjusted under 35 U.S.C. 154(b) by 380 days.

(21) Appl. No.: 18/515,038

(22) Filed: Nov. 20, 2023

(65) Prior Publication Data

US 2024/0172000 A1    May 23, 2024

(30) Foreign Application Priority Data

Nov. 23, 2022    (IN) .............................. 202211067254

(51) Int. Cl.
*H04W 24/02* (2009.01)
*H04B 17/309* (2015.01)
*H04W 24/08* (2009.01)

(52) U.S. Cl.
CPC .......... *H04W 24/02* (2013.01); *H04B 17/309* (2015.01); *H04W 24/08* (2013.01)

(58) Field of Classification Search
CPC .... H04W 24/02; H04W 24/08; H04B 17/309; H01J 37/05; H04L 27/2663
See application file for complete search history.

(56) References Cited

U.S. PATENT DOCUMENTS

| | | | |
|---|---|---|---|
| 8,831,150 B1 | 9/2014 | Xu et al. | |
| 2003/0112743 A1* | 6/2003 | You ..................... | H04L 27/2663 |
| | | | 370/208 |
| 2008/0043886 A1 | 2/2008 | Inagawa et al. | |
| 2013/0136198 A1 | 5/2013 | Chavali et al. | |
| 2022/0231884 A1 | 7/2022 | Bradley et al. | |
| 2023/0136198 A1* | 5/2023 | Akiba ..................... | H01J 37/05 |
| | | | 250/310 |

FOREIGN PATENT DOCUMENTS

| | | |
|---|---|---|
| GB | 2602683 | 7/2022 |

OTHER PUBLICATIONS

IPO Combined Search and Examination Report under Sections 17 and 18(3) for Great Britain Application No. 2300880.8, dated Jul. 20, 2023, 7 pages.

* cited by examiner

*Primary Examiner* — Vinncelas Louis
(74) *Attorney, Agent, or Firm* — Klarquist Sparkman, LLP

(57)    ABSTRACT

A radio receiver is arranged to detect a symbol boundary in a received encoded signal, by receiving the signal, and correlating a portion of the received signal against a predetermined training field sequence to generate a correlation signal. The portion of the received signal has a length which is shorter than the length of the predetermined training field sequence. The radio receiver is also arranged to compare the correlation signal to a threshold derived from the received signal, and identify at least one peak in the correlation signal if any portion of the correlation signal exceeds the threshold. The symbol boundary is derived from the at least one peak.

22 Claims, 7 Drawing Sheets

SYMBOL BOUNDARY DETECTION

CROSS REFERENCE TO RELATED APPLICATION

This application claims priority from India Patent Application No. 202211067254, filed Nov. 23, 2022, which application is incorporated herein by reference in its entirety.

BACKGROUND OF THE INVENTION

This invention relates to the synchronisation of a radio receiver, particularly though not exclusively a Wifi® receiver.

Many modern electronic devices include one or more radio transceivers, receivers, or transmitters for carrying out wireless communication with other devices. There are a number of wireless communication protocols, known in the art per se, for carrying out such communications, including Bluetooth®, Bluetooth Low Energy®, Wi-Fi®, and Zig-Bee®.

In accordance with wireless communication protocols, after a radio receiver receives a packet within a radio signal, the radio receiver is generally required to transmit a response back to the transmitter of the radio signal to acknowledge receipt of the packet. This response must be sent within the Symbol Inter Frame Space (SIFS) time which follows the packet. If there is too much latency in the receiver system, the transmission of a response may be delayed too much, and unable to fit within the SIFS time. Thus, it is advantageous to detect and process a packet as quickly as possible to reduce latency.

Receiving a packet in a radio signal first requires that the receiver determines the start of the packet to establish symbol timing, enabling the rest of the packet to be decoded. In accordance with at least some wireless communication protocols, a radio receiver generally looks for a certain preamble (i.e. a portion of a received data signal on a frequency monitored by the receiver). This preamble is typically a simple repeating signal pattern that is known to the receiver a priori, which helps the receiver to perform symbol timing estimation.

In order to detect this preamble, conventional radio receivers commonly use a correlator that correlates samples of incoming signals with the expected preamble signal pattern. Typical solutions for determining a symbol boundary for the start of a packet post-process correlated data across the expected preamble. When the correlator finds a plateau within the correlated data, the radio receiver determines that the preamble region has been detected. Once the preamble is detected, the receiver moves to the next stage. The post processing cannot finish until all samples have been received and correlated, so the symbol boundary will always be detected in a fixed time. The Applicant has appreciated that this method of determining a packet symbol boundary requires significant processing resource in order to be able to send a response in the tight SIFS available.

SUMMARY OF THE INVENTION

From a first aspect, the invention provides a method of operating a radio receiver to detect a symbol boundary in a received encoded signal, the method comprising:

receiving the signal;

generating a series of correlation values by stepping a predetermined training field sequence along the received signal until a symbol boundary is detected, wherein each correlation value is calculated by correlating a corresponding portion of the received signal with the predetermined training field sequence; and as each successive correlation value is generated, comparing the correlation value to a threshold derived from the received signal, and if the correlation value exceeds the threshold:

determining a position of a first correlation peak; and deriving the symbol boundary from the position of the first correlation peak;

wherein the method comprises, once the symbol boundary has been derived, stopping generating any further correlation value beyond a predetermined peak-detection window including the first correlation peak.

From a second aspect, the invention provides a radio receiver arranged to detect a symbol boundary in a received encoded signal by:

receiving the signal;

generating a series of correlation values by stepping a predetermined training field sequence along the received signal until a symbol boundary is detected, wherein each correlation value is calculated by correlating a corresponding portion of the received signal with the predetermined training field sequence; and as each successive correlation value is generated, comparing the correlation value to a threshold derived from the received signal; and if the correlation value exceeds the threshold:

determining a position of a first correlation peak; and deriving the symbol boundary from the position of the first correlation peak;

wherein the radio received is arranged, once the symbol boundary has been derived, to stop generating any further correlation value beyond a predetermined peak detection window including the first correlation peak.

Thus it will be seen that, in accordance with at least embodiments of the invention, the position of a correlation peak can be determined and the symbol boundary derived as soon as a correlation value has crossed a threshold. This means the correlation process can be stopped earlier so the receiver does not need to post-process correlated data from across the full length of the received signal to retrieve a peak, rather a local peak can be identified earlier subject to threshold criteria.

After correlating a first portion of the received signal which has the same length as the predetermined training field sequence without detecting a peak, the training field sequence is stepped along the received signal so that subsequent portions of the received signal may be correlated. This process may continue until a peak is identified, or alternatively, if no peak is identified, until the received signal has been correlated against the training field sequence a number of times that is equal to the number of samples in the training field sequence.

In accordance with the invention, once the symbol boundary has been derived from an identified correlation peak, no further portions of the received signal are correlated to generate correlation values, i.e. peak identification processing only occurs until the point at which a peak is identified. Accordingly, parts of the received signal which follow the peak detection window including the identified first correlation peak will not be processed to generate correlation values. This may save on power by reducing the processing needed to establish synchronisation.

In a set of embodiments, after a correlation value exceeds the corresponding derived threshold, the position of the correlation peak is determined by triggering a peak detection process. In a set of embodiments, the peak detection process comprises generating the next successive correlation values for a period of time equal to the predetermined peak-detection window. The first correlation value in the peak-detection window may be the correlation value which initially exceeded the threshold, and a series of successive correlation values may be generated until the end of the peak-detection window. The position of a correlation peak may then be determined by searching within the peak-detection window. In a set of embodiments, the correlation values in the peak-detection window are averaged by applying a filter, and the position of the correlation peak is determined from the shape of the filter output, in particular a portion thereof when the output has a highest value. Although the symbol boundary may be derived from any position in the portion of the filter output which has a highest value, in a set of embodiments, the symbol boundary is derived from the central position of said portion. The filter may be any filter with averaging properties across the peak-detection window, for example, it may be a rectangular window filter. Other suitable filters may include a Hanning window, a Hamming window, a Blackman window and a Kaiser window.

The Applicant has found that using a peak-detection window and applying an averaging filter after the correlation values exceed the threshold advantageously reduces inter-symbol interference in the case of multi-path signal reception. In the case of multi-path interference, sets of multiple peaks in the correlation values that occur close together in the peak-detection window will be averaged, such that the position of the correlation peak is determined by the set of peaks. In a set of embodiments, the length of the peak-detection window is equal to the length of a guard interval used in the received signal. This length of time has been found to be particularly advantageous for reducing multi-path interference.

Upon receiving the signal, typically the signal is sampled, and those samples stored in a storage buffer. The storage buffer may hold the incoming received signal until the symbol boundary is detected. By not waiting to correlate all portions of the received signal with the training field sequence, but rather detecting a peak and determining a corresponding symbol boundary earlier, the proposed system may be able to use less storage than prior art post-processing systems.

Those skilled in the art will appreciate that the radio receiver may comprise a number of components typical of a radio reception chain, e.g. antennas, filters, digital signal processors, microcontrollers, etc. Typically, the radio receiver further comprises a demodulator arranged to demodulate the received digital radio signal.

In accordance with embodiments of the invention, by comparing the successive correlation values to a threshold which is derived from the received signal, the threshold for triggering a process to determine the location of a peak can vary dynamically, and may consequently provide a more reliable threshold measure than a fixed threshold for determining whether a peak is present in the time window.

In a set of embodiments, the threshold is derived from a moving average of the energy of the correlated portion of the received signal. The threshold may be defined as the energy of the received signal itself or derived in any other way from it, for example, it may be derived from the moving average of the energy of the received signal multiplied by a configurable factor. In embodiments where the threshold is derived from a moving average of the energy of the received signal, the energy of the correlation values is compared to the threshold to determine whether a peak is present. Deriving the threshold from a moving average of energy allows the threshold to vary dynamically such that it can vary in dependence on signal properties and the transmission environment. This may provide a better threshold for determining the presence of a meaningful peak in the series of correlation values than a fixed threshold, reducing the likelihood of a high correlation value due to noise being considered as a correlation peak. Using a moving average for the threshold further allows the threshold to be calculated in parallel with the correlation process. Thus, post-processing across the full length of the received signal is not required to derive the threshold.

In a set of embodiments, following the comparison to the threshold, the series of correlation values are processed such that any correlation values which do not exceed the threshold are set to zero. Accordingly, any small peaks which fall below the threshold can be removed from the signal such that they are not carried forward into any subsequent processing steps. This may be advantageous especially in a set of embodiments where the magnitude of the correlation signal is multiplied by a normalisation factor in dependence on the correlation energy value corresponding to the detected correlation peak. Accordingly, small peaks falling below the threshold are not magnified such that they affect the determination of symbol boundaries from a correlation peak in a later processing step.

In a set of embodiments, the symbol boundary is derived from the at least one peak by calculating the symbol boundary index as corresponding to the central position within the output of the averaging filter in the peak-detection window. In embodiments where the energy of the correlation values in the peak-detection window are averaged following comparison to the threshold, the symbol boundary may be derived from a position corresponding to the centre of the highest portion of the averaging filter output.

The symbol boundary may be derived by determining an index in the received signal storage buffer that corresponds to the point in time that the correlation peak is identified. This index is then taken to be the point in the storage buffer where the predetermined training field sequence in the received signal begins. Typically, the received signal is decoded after the symbol boundary has been derived by reading the storage buffer starting from the symbol boundary index.

In a set of embodiments, after the received signal has started being decoded, a reliability of the derived symbol boundary is estimated by comparing the energy, which may be averaged or absolute, of the correlation peak to a reliability threshold at the derived symbol boundary. If the energy of the correlation value at the symbol boundary is not sufficiently high compared to the reliability threshold, it may be determined that the identified peak is false, and accordingly the decoding of the received signal may be aborted. The reliability threshold may be derived from the average energy of the received signal across a longer period of time, e.g., over a portion of the received signal which is longer than the correlated portion of the received signal. Alternatively, it may be derived from the energy of the received signal at a time corresponding to the determined symbol boundary, or any other appropriate threshold.

From a further aspect, the invention provides a method of operating a radio receiver to detect a symbol boundary in a received encoded signal, the method comprising:

receiving the signal;

generating a series of correlation values by stepping a
       predetermined training field sequence along the received signal until a symbol boundary is detected, wherein each correlation value is calculated by correlating a corresponding portion of the received signal with the predetermined training field sequence;

for each successive correlation value:

deriving a threshold from the portion of the received signal used to calculate the correlation value; and comparing the correlation value to the threshold; and if the correlation value exceeds the threshold:

determining a position of a correlation peak; and deriving the symbol boundary from the position of the correlation peak.

From a further aspect, the invention provides a radio receiver arranged to detect a symbol boundary in a received encoded signal by:

receiving the signal;

generating a series of correlation values by stepping a predetermined training field sequence along the received signal until a symbol boundary is detected, wherein each correlation value is calculated by correlating a corresponding portion of the received signal with the predetermined training field sequence;

for each successive correlation value:

deriving a threshold from the portion of the received signal used to calculate the correlation value; and comparing the correlation value to the threshold; and if the correlation value exceeds the threshold:

determining a position of a correlation peak; and deriving the symbol boundary from the position of the correlation peak.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

A specific embodiment of the invention will now be described, by way of example only, with reference to the accompanying drawings, in which.

DETAILED DESCRIPTION

Figure 1:
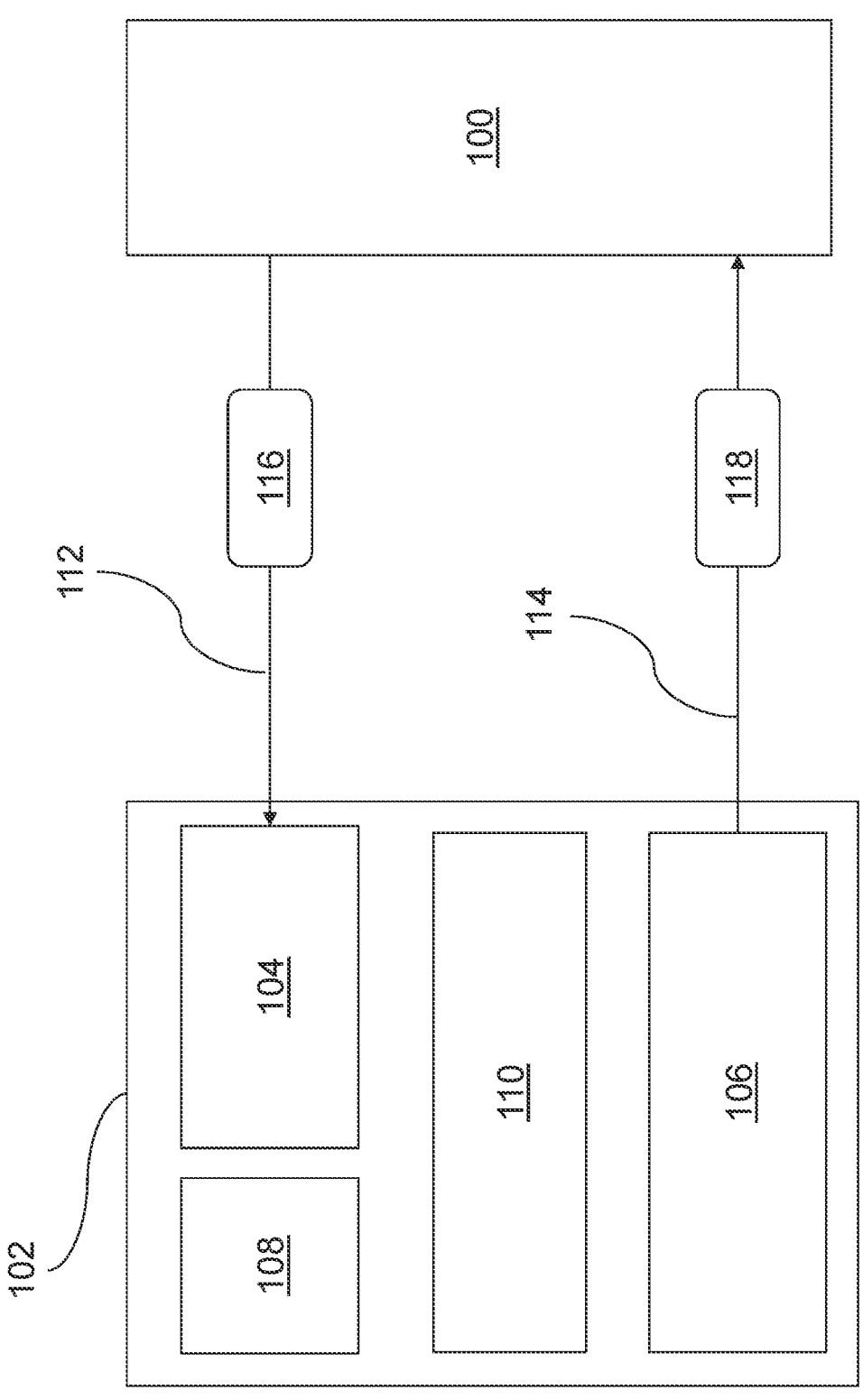
FIG. 1 is a high-level schematic view of a radio system in accordance with embodiments of the invention.

FIG. 1 shows a high-level schematic diagram of a radio system comprising a first radio transceiver device 100 and a second radio transceiver device 102. As shown for the transceiver device 102, the devices have receiver circuitry 104 and transmitter circuitry 106. A processor 108 and correlator 110 are also provided. As will be well understood by those skilled in the art, a number of other standard modules such as oscillators, filters, mixers, digital to analogue converters (DACs) and analogue to digital converters (ADCs) are provided in the radio transceivers 100 and 102 but the description of these are omitted for the sake of brevity.

The transceivers 100, 102 may be any devices capable of radio communications, e.g. WiFi® transceivers, Bluetooth Low-Energy (BLE) transceivers, mobile communications devices, etc, but in the set of embodiments described herein they are Wi-Fi transceivers.

The transceivers 100, 102 are each operable in a transmission mode in which they are capable of transmitting radio signals, and a reception mode in which they are capable of receiving radio signals. It will be appreciated, however, that when the transceivers 100, 102 are in communication, one of the transceivers 100, 102 will operate in the transmission mode while the other transceiver 100, 102 will operate in the reception mode. A first signal path 112 illustrates one or more radio signals that are transmitted by the first transceiver 100 when it is operating in the transmission mode and received by the second transceiver 102 when it is operating in the reception mode. Shown in FIG. 1 is the transmission of a WiFi® packet 116 from the transceiver 100 to the transceiver 102. A second signal path 114 illustrates one or more radio signals that are transmitted by the second transceiver 102 when operating in the transmission mode. Shown in FIG. 1 is the transmission of a WiFi® packet 118 from transceiver 102 to transceiver 100.

In accordance with standard WiFi® protocols, after the WiFi® packet 116 is received by the transceiver 102, the transceiver 102 sends the WiFi® packet 118 to the transceiver 100 in response. This response may be in the form of an acknowledgement.

Figure 2:
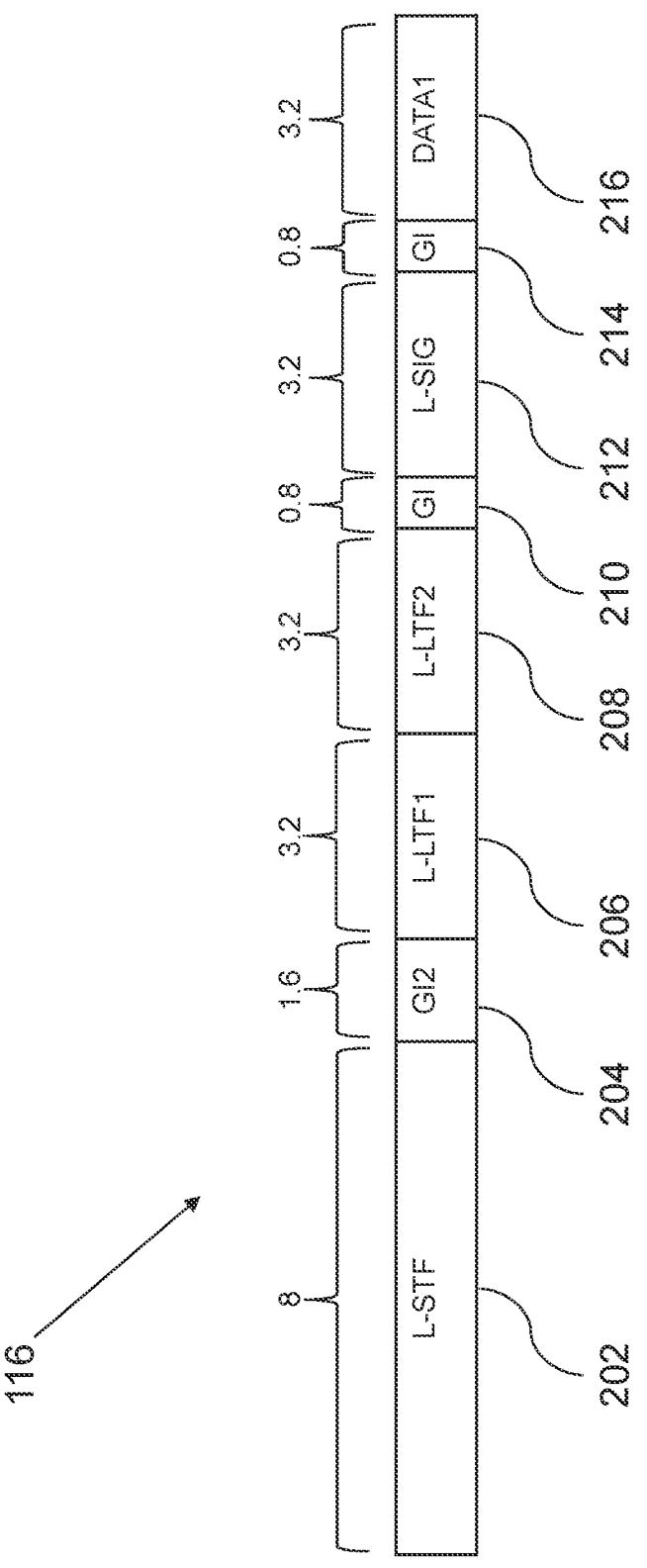
FIG. 2 is an exemplary WiFi® packet used in a radio system in accordance with the invention.

FIG. 2 shows an exemplary format of the WiFi® packet 116 sent to the transceiver device 102. The diagram shows the fields within a legacy 54 mbps RX packet along with the field durations which may be used in accordance with WiFi® standards such as 802.11.g, 802.11.n, 802.11 ac and 802.11.ax. The packet has, labelled left to right, a legacy short training field (L-STF) 202 for a duration of 8 μs, a guard interval (GI2) 204 for 1.6 μs, a legacy long training field (L-LTF) made of two training fields L-LTF1 206 and L-LTF2 208 for a total duration of 6.4 μs, a guard interval (GI) 210 for 0.8 μs, a legacy signal field (L-SIG) 212 (formally known as the PHY-layer payload) for 3.2 μs, another guard interval (GI) 214 for 0.8 μs, and the payload of the packet (DATA1) 216 for 3.2 μs. Of course, the payload may have a longer length, depending on the data which needs to be transmitted.

The short training field 202 provides a periodic orthogonal frequency division multiplexing (OFDM) waveform containing several repetitions of a short training signal. The many repetitions of a short training signal in the L-STF are autocorrelated to allow the receiver to establish a coarse estimation of symbol timing—i.e. no prior knowledge of the short training field is needed.

The L-LTF contains a predetermined long training field sequence. The signal at the receiver can therefore be cross-correlated with the known long training field sequence to establish fine-tuned time synchronisation.

The guard intervals throughout the WiFi® packet 116 are positioned so as to minimise signal loss from the effect of multipath transmission. In wireless transmission, radio signals may on occasion reach the receiving antenna by more than one path due to reflections and/or obstacles in the environment. If one of the information symbols reaches the antenna too fast, it may interfere with the reception of an earlier symbol.

Figure 3:
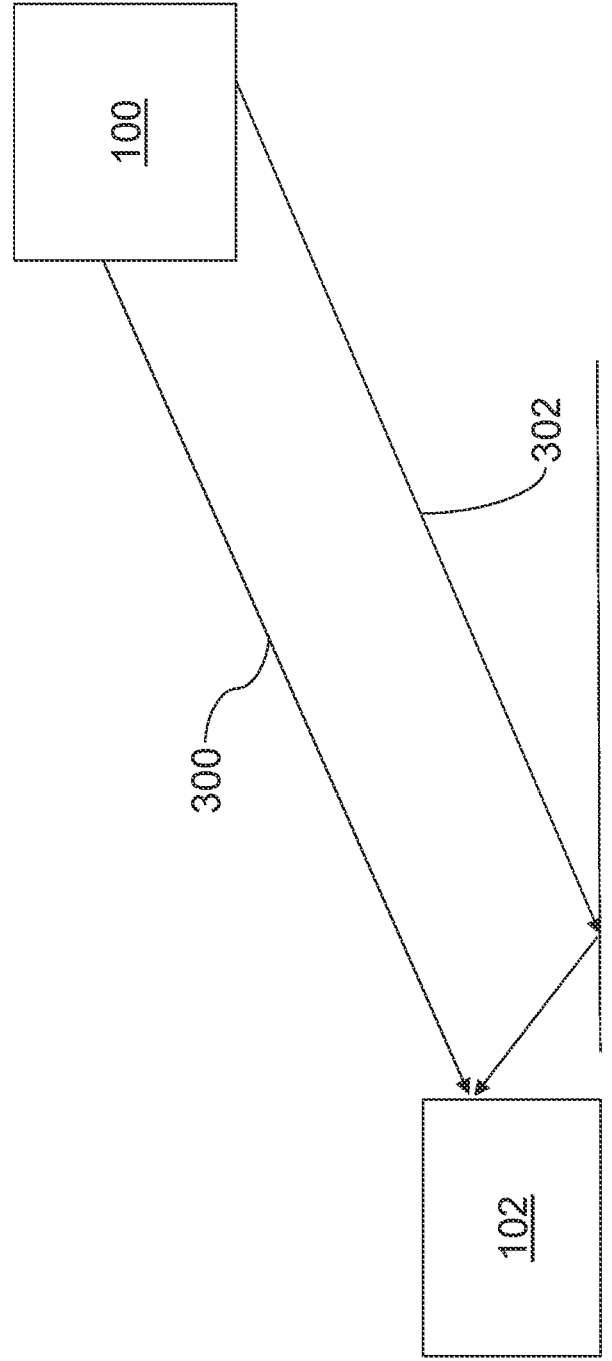
FIG. 3 is high level schematic demonstrating the occurrence of multipath packet reception.

FIG. 3 is high level schematic diagram demonstrating the occurrence of multipath reception. A first signal path 300 is taken directly from the transceiver 100 to the transceiver 102. However, a second signal path 302 first takes a reflection, and so has a longer path to the transceiver 102. Accordingly, packets transmitted along the first signal path 300 will arrive at the transceiver 102 earlier than those transmitted along the second signal path 302.

Figure 4:
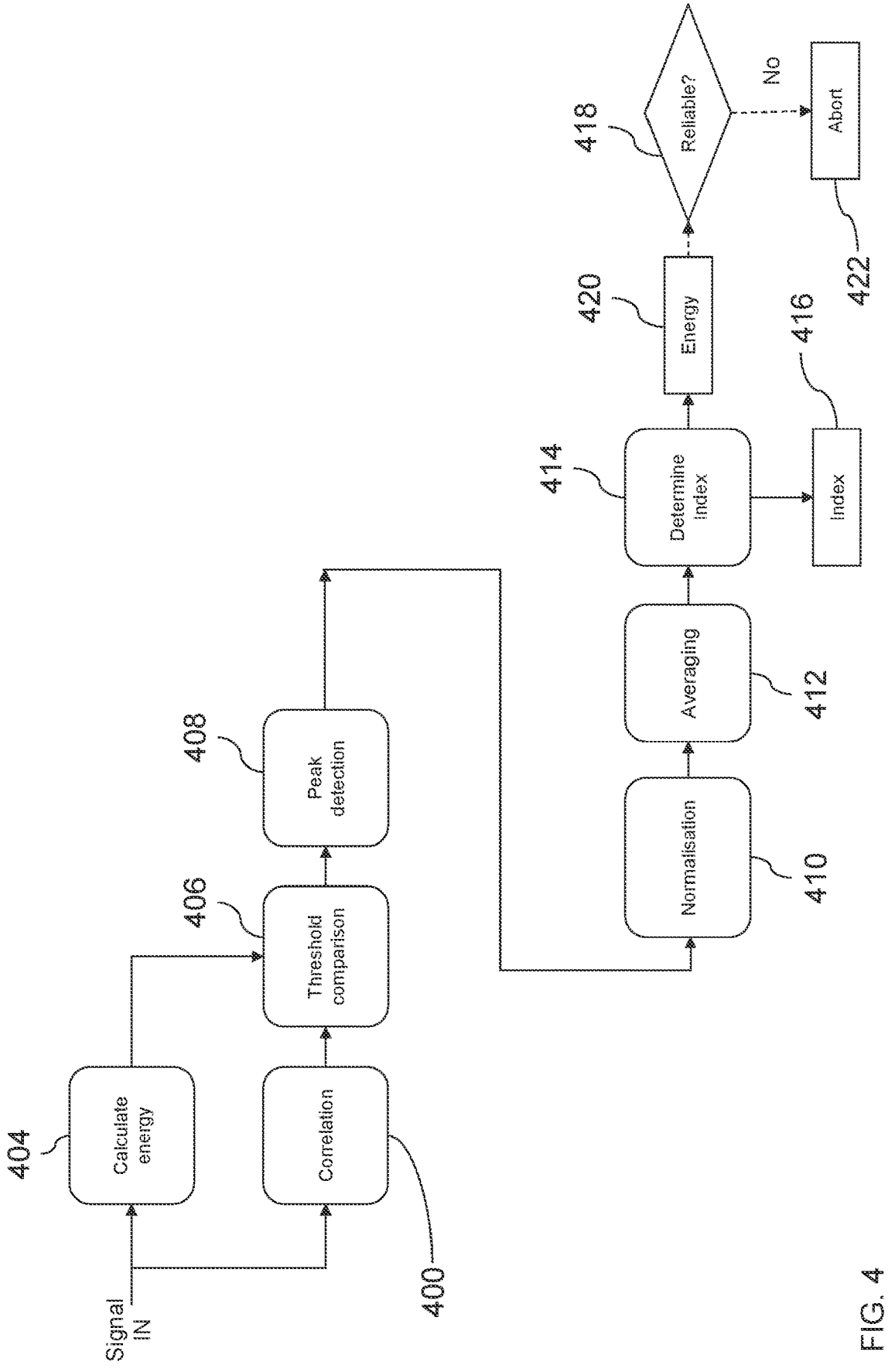
FIG. 4 is a flow chart of a method for identifying a symbol boundary in a received packet in accordance with the invention.

FIG. 4 is a flow diagram showing the steps performed by receiver 102 in order to detect a symbol boundary. FIG. 5 shows how the series of correlation values generated by correlating portions of the received signal with the long training field is processed at each step of the flow diagram of FIG. 4. Both Figures are referred to in the explanation below.

Figures 5A, 5B, 5C, 5D:
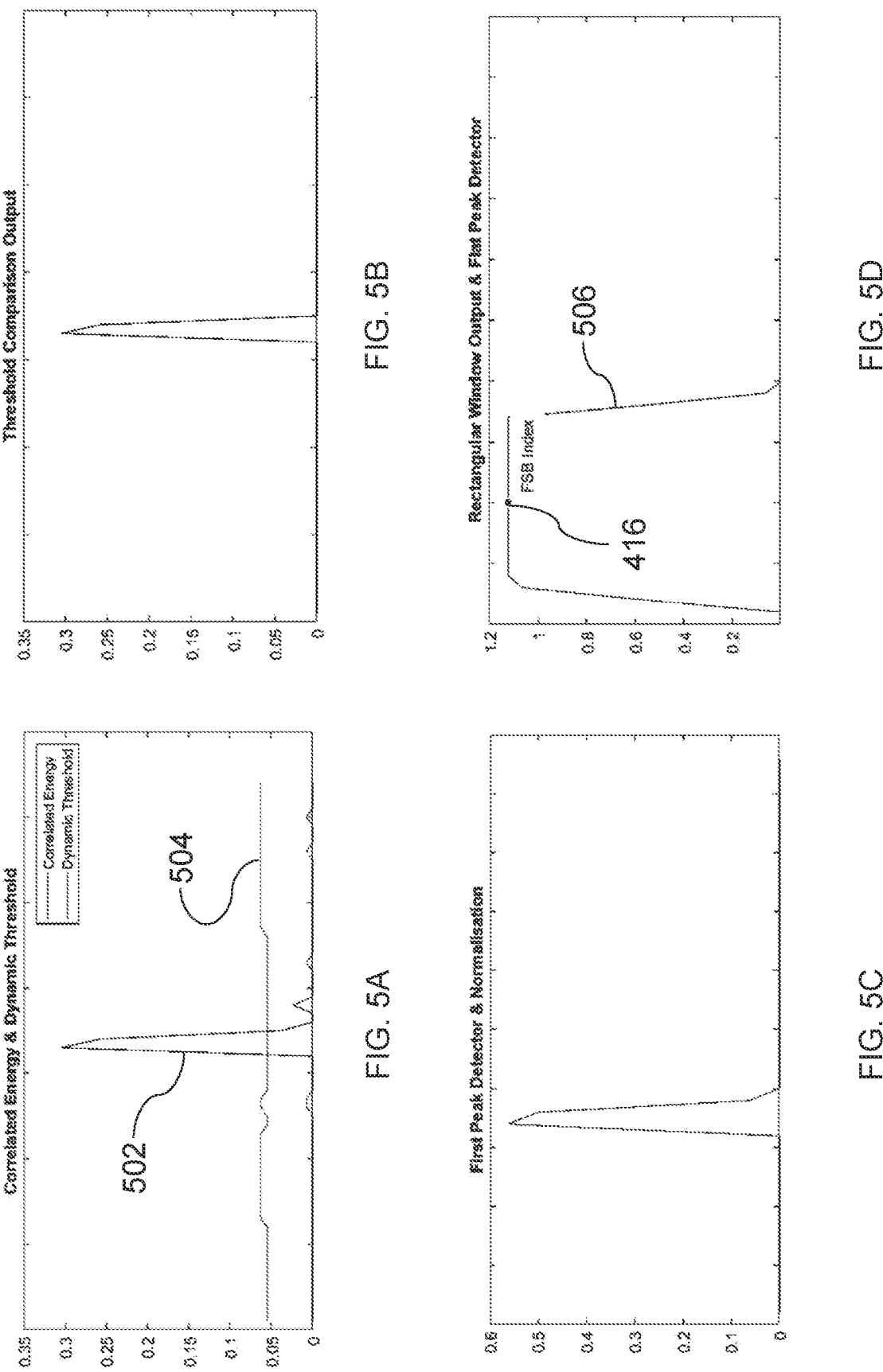
FIGS. 5A-5D show the effects on the series of correlation values at intermediate steps of the method of FIG. 4 for an exemplary correlation in a single path environment.

In step 400, samples for a portion of the received signal are cross-correlated in the time domain with a reference long training field, and a correlation value is calculated, with a higher correlation value indicating a stronger correlation between the portion of the received signal and the reference long training field. The average energy of the same portion of the received signal is calculated in step 404. The process is repeated by stepping the reference long training field along the samples of the received signal in order to generate a series of correlation values, and a corresponding series of signal energy values. The series of correlation values 502 is shown in FIG. 5A.

In step 406, the correlation value calculated in step 400 is compared to a threshold. The dynamic threshold 504 which is used for this comparison is shown in plot FIG. 5A. The energy of the received signal calculated in step 404 may be used to derive this threshold; in a set of embodiments the threshold may be a moving average of the signal energy multiplied by a configurable factor.

Any correlated energies which don't exceed the dynamic threshold 504 are zeroed in order to filter out noise and prevent false peak detections. The result of this noise filtering process following the threshold comparison is shown in FIG. 5B. If the threshold is not exceeded by the correlation value in step 406, steps 400 and 404 continue to be repeated for successive portions of the received signal.

If the correlation value is found to exceed the threshold 504, further successive correlation values are calculated for a short time interval following the correlation value that first exceeded the threshold, and all correlation values that are higher than the threshold in the short time interval are forwarded to the first peak detection step 408.

The time series of correlation values in this time interval will, in the following description, be referred to as the "peak-search correlation series".

In the first peak detector step 408, the peak-search correlation series is used in order to identify a peak in energy which occurs in the correlation signal 502. A peak may be identified by finding a correlation value which is higher than its neighbours. Each peak in the peak-search correlation series is assumed to correspond to a path over which a symbol of the packet has been received. Depending on the environment in which the WiFi® packet has been transmitted, the packet may have followed a single path to the receiver, or there may be multiple paths the packet has taken to the receiver (e.g. due to reflections, as explained above with reference to FIG. 3). In the case of a single path there will only be one peak in the peak-search correlation series, but in multipath environments multiple peaks may appear. The correlation signal 502 shown in FIGS. 5A-D arises from a single path.

In step 410 the peak-search correlation series is normalised using the highest correlation value in the series. Further elimination of noise may be conducted by comparing the energy of the correlation signal to a second threshold. This threshold may be fixed, or also derived from the received signal. The output of this normalisation step is shown in FIG. 5C.

In step 412, the energy of the remaining normalised series of correlation values is averaged over a peak-detection interval. This may be achieved by applying a rectangular window filter, or any filter with appropriate averaging properties. The output of this filter is shown in FIG. 5D. The applicant has found that applying an averaging filter across a peak-detection window is particularly beneficial for mitigating against inter-symbol interference in a multi-path environment, which will be explained further with reference to FIG. 6D.

In step 414, a symbol boundary position 416 is derived from the middle position of the highest portion of the filter output 506. This position corresponds to the centre of the plateau shown in in FIG. 5D for the single-path case. The index of the symbol boundary in the received sample stream where the long training field starts is then derived from the middle position of the plateau.

In a final step 418, which occurs after decoding the received sample stream has started, the energy of the correlation value 420 at the middle position 416 in the plateau is used to estimate the reliability of the symbol boundary index. If a comparison of the energy of the correlation at the derived symbol boundary to the energy of the signal reveals that it is not large enough to denote a peak, the reliability of the peak can be deemed to be too low and the reception of the packet can be aborted in step 422.

FIGS. 6A-6D show how a multi-path correlation signal 602 is processed for a multi-path received signal rather than a single-path received signal as shown in FIGS. 5A-5D. The correlation signal 602 is shown across different intermediate stages of the flow diagram of FIG. 4 in a similar manner to FIGS. 5A-5D.

Figures 6A, 6B, 6C, 6D:
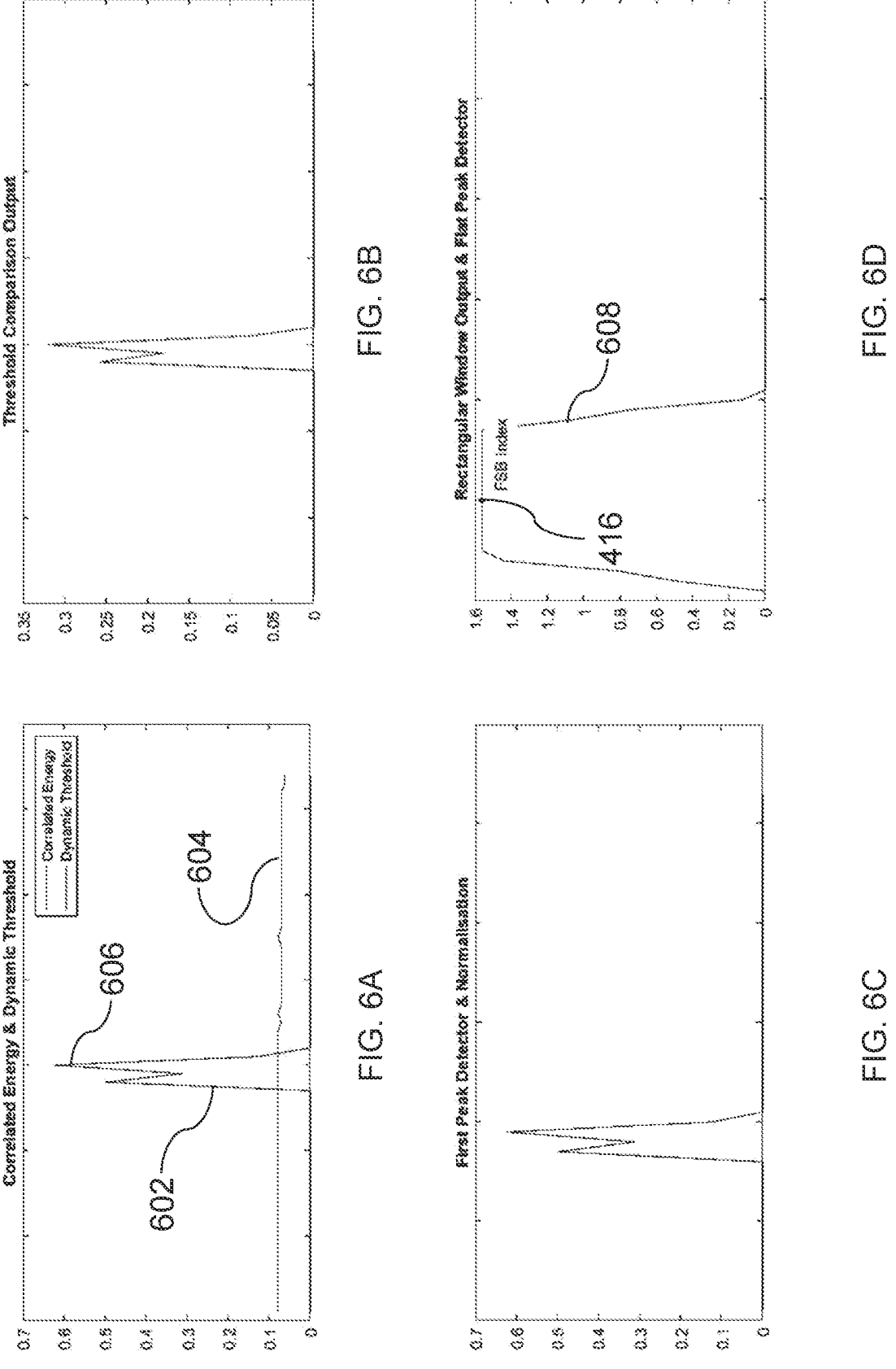
FIGS. 6A-6D show the effects on the series of correlation values at intermediate steps of the method of FIG. 4 for an exemplary correlation in a multipath environment.

FIG. 6A shows a comparison between the multi-path series of correlation values 602 and energy threshold 604, where the energy threshold may be derived from the moving average energy of the correlated portion of the received multi-path signal, as was the case for the single-path process shown in FIGS. 5A-D. Whereas the single-path correlation resulted in a single peak in the correlation signal, the multi-path signal results in a double peak 606. Following the threshold comparison shown in FIG. 6B, and the peak detection and normalisation shown in FIG. 6C, the double peak 606 is averaged to generate the filter output 608 shown in FIG. 6D. This may be achieved by applying a rectangular window filter as described in relation to step 412. The position of the symbol boundary 416 is calculated as the central position within the highest plateau 608 as shown in FIG. 6D.

Determining the position corresponding to the symbol boundary within the filter output 608 generated by the averaging filter has been found to be particularly advantageous for handling multi-path reception. In particular, using a time interval for the averaging filter that is equal to the guard interval between symbol in the received signal means that as long as the peak is identified in the highest portion of the peak 608, the corresponding symbol boundary that is derived will not result in decoding part of an adjacent symbol from one of the received signal paths.

Figures 7A, 7B:
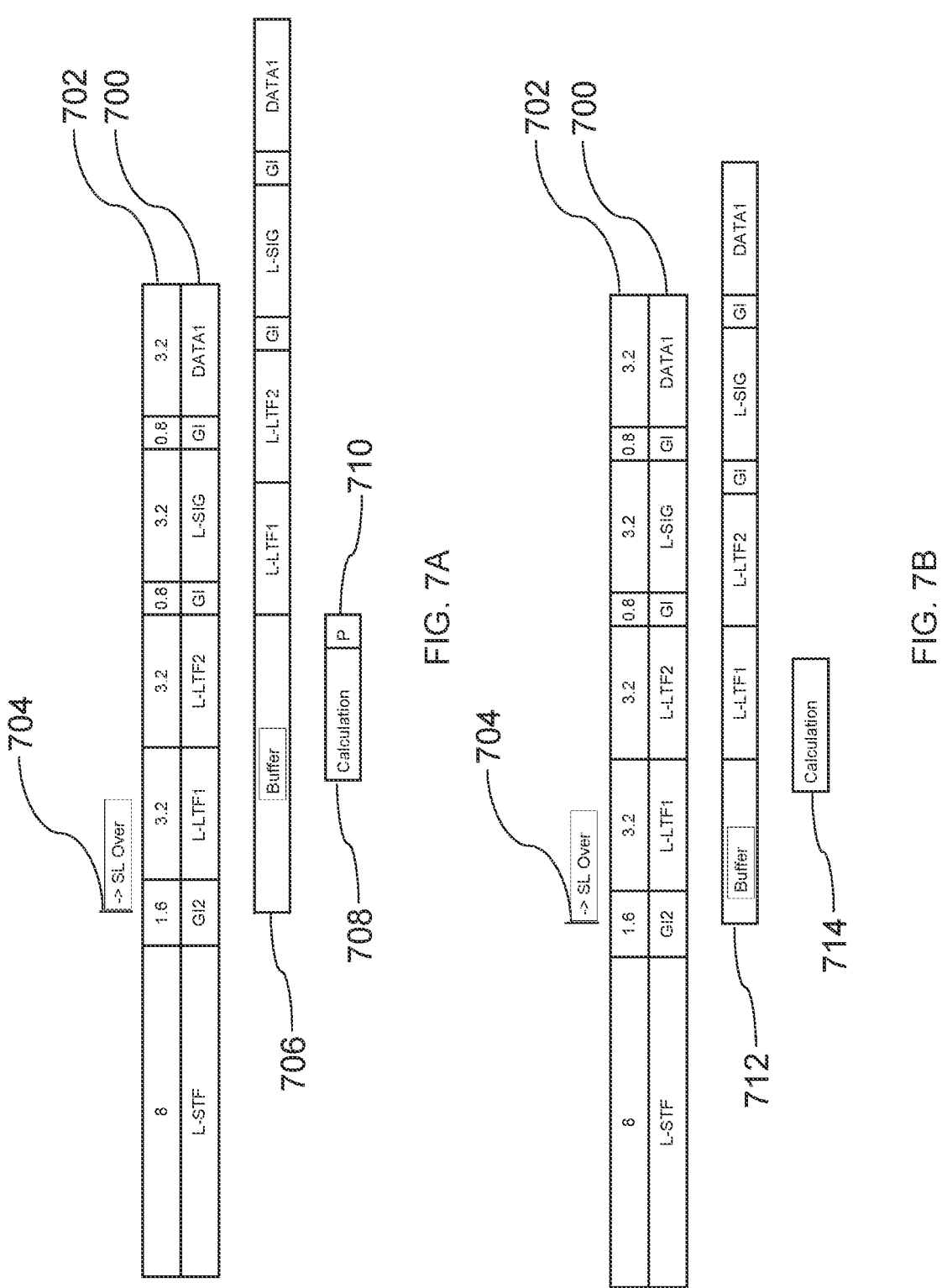
FIG. 7A shows the fields of a received packet along with the hardware processor timings for receipt of the packet in accordance with a typical prior art system.
FIG. 7B shows the fields of a received packet along with the hardware processor timings for receipt of the packet in accordance with the invention.

Determining the symbol boundary index allows the receiver to begin decoding the received signal. Incoming signal samples are stored in a storage buffer until the symbol boundary is determined, thus, the quicker the symbol boundary is established, the less memory needs to be used to store the incoming signal. FIG. 7A shows a timing diagram for the process of receiving a packet, carrying out the calculation to determine the symbol boundary, and subsequently decoding the received signal in accordance with a typical prior art process. FIG. 7B shows the equivalent process of symbol detection in accordance with the invention.

A legacy 54 mbps RX packet 700 (equivalent to the legacy packet 116 shown in FIG. 2) is shown along with the corresponding field durations 702 (with units of µs) in FIGS. 7A and 7B. The timings of the processing steps which occur to identify the symbol boundary in accordance with a prior art system are shown in lines 706 and 708 of the timing diagram in FIG. 7A relative to the fields of the packet 700.

Lines 712 and 714 in FIG. 7B show the symbol boundary detection calculations and processes for the proposed low-latency symbol boundary detection process in accordance with embodiments of the invention, also relative to the fields of the packet 700.

As described with reference to FIG. 2, the receiver uses the L-STF field of the incoming signal to detect a coarse symbol boundary estimate. This then triggers the SLOver event 704 around the boundary between the short and long training fields (L-STF & L-LTF). After the SLOver event is triggered, a storage buffer is filled with samples of the received signal in a buffer stage 706.

In the calculation stage 708 of a typical prior art process shown in FIG. 7A, the buffer is filled with received samples of the signal, all of which are correlated against the known long training field (L-LTF). The post processing stage 710 (P) shows that detection of the symbol boundary cannot be completed until all the samples have been received and correlated.

In contrast, for the calculating step 714 of FIG. 7B in accordance with the invention, no post-processing stage 710 is required, because all of the received samples do not need to have been received and correlated in order to identify the symbol boundary. Accordingly, the buffer stage 712 does not continue for as long as the buffer stage 706, and the packet 700 can begin to be decoded earlier, as soon as a peak is detected and symbol boundary subsequently derived, without needing to process all of the received samples.

The proposed symbol boundary detection process does not work in a fixed time, because it will depend on where the peak is located in the series of correlation values. Instead, the received samples which follow the correlated portion of the received signal containing an identified peak in time will not be post-processed to search for a peak. For typical cases the algorithm can detect the symbol boundary in less than L-LTFn+GI2 (3.2 us+0.8 us). This saves time in comparison to the symbol boundary detection for the proposed system, which cannot complete until the end of L-LTF2 (i.e. 3.2 µs+3.2 µs+0.8 µs).

Accordingly, the speed of the symbol boundary detection process is improved, and the resource (i.e. buffer size) required for storing received samples is reduced. This advantageously improves both the latency and the hardware use of the process in comparison to prior art systems. It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A radio receiver arranged to detect a symbol boundary in a received encoded signal, the radio receiving comprising:
   receiver circuitry configured to receive the signal; and
   a processor configured to:
      generate a series of correlation values by stepping a predetermined training field sequence along the received signal until a symbol boundary is detected, wherein each correlation value is calculated by correlating a corresponding portion of the received signal with the predetermined training field sequence; and
      as each successive correlation value is generated compare the correlation value to a threshold derived from the received signal; and if the correlation value exceeds the threshold:
      determine a position of a first correlation peak; and
      derive the symbol boundary from the position of the first correlation peak;
   wherein the radio receiver is arranged, once the symbol boundary has been derived, to stop generating any further correlation values beyond a predetermined peak-detection window including the first correlation peak.

2. The radio receiver as claimed in claim 1, wherein the processor is arranged to:
   sample the received signal; and
   store the samples of the received signal in a storage buffer;
   wherein the samples are arranged to be stored until the symbol boundary is detected.

3. The radio receiver as claimed in claim 1, wherein the threshold is derived from a moving average of the energy of the correlated portion of the received signal, and wherein the processor is arranged to compare the energy of the correlation values to the threshold.

4. The radio receiver as claimed in claim 1, wherein the processor is arranged to process the series of correlation values such that correlation values which do not exceed the threshold are set to zero following comparison to the threshold.

5. The radio receiver as claimed in claim 1, wherein position of the first
   correlation peak is determined by:
      generating next successive correlation values for a period of time equal to the peak-detection window; and
      determining the position of the first correlation peak by searching within the peak-detection window.

6. The radio receiver as claimed in claim 5, wherein the length of the peak-detection window is equal to a length of a guard interval used in the received signal.

7. The radio receiver as claimed in claim 5, wherein the processor is arranged to average the energy of the next successive correlation values by applying an averaging filter which has the same length as the peak-detection window.

8. The radio receiver as claimed in claim 7, wherein the processor is configured to derive the symbol boundary from a position corresponding to the centre of the highest portion of the averaging filter output.

9. The radio receiver as claimed in claim 1, wherein the processor is arranged to estimate a reliability of the derived symbol boundary by comparing an energy of the first correlation peak at the derived symbol boundary to a reliability threshold.

10. The radio receiver as claimed in claim 9, wherein the processor is arranged to determine that the first correlation peak is false and abort decoding of the received signal if the energy of the correlation value at the derived symbol boundary is not sufficiently high compared to the threshold.

11. The radio receiver as claimed in claim 9, wherein the reliability threshold is derived from an average energy of the received signal.

12. A method of operating a radio receiver to detect a symbol boundary in a received encoded signal, the method comprising:

receiving the signal;

generating a series of correlation values by stepping a predetermined training field sequence along the received signal until a symbol boundary is detected, wherein each correlation value is calculated by correlating a corresponding portion of the received signal with the predetermined training field sequence; and as each successive correlation value is generated, comparing the correlation value to a threshold derived from the received signal, and if the correlation value exceeds the threshold:

determining a position of a first correlation peak; and deriving the symbol boundary from the position of the first correlation peak;

wherein the method comprises, once the symbol boundary has been derived, stopping generating any further correlation value beyond a predetermined peak-detection window including the first correlation peak.

13. The method as claimed in claim 12, comprising sampling the received signal; and storing the samples of the received signal in a storage buffer;

wherein the samples are stored until the symbol boundary is detected.

14. The method as claimed in claim 12, comprising deriving the threshold from a moving average of the energy of the correlated portion of the received signal and comparing the energy of the correlation values to the threshold.

15. The method as claimed in claim 12, comprising processing the series of correlation values such that correlation values which do not exceed the threshold are set to zero following comparison to the threshold.

16. The method as claimed in claim 12, comprising determining the position of the correlation peak by:

generating next successive correlation values for a period of time equal to a peak-detection window; and determining the position of a correlation peak by searching within the peak-detection window.

17. The method as claimed in claim 16, wherein the length of the peak-detection window is equal to a length of a guard interval used in the received signal.

18. The method as claimed in claim 16, comprising averaging the energy of the next successive correlation values by applying an averaging filter which has the same length as the peak-detection window.

19. The method as claimed in claim 18, comprising deriving the symbol boundary from a position corresponding to the centre of the highest portion of the averaging filter output.

20. The method as claimed in claim 12, comprising estimating a reliability of the derived symbol boundary by comparing an energy of the correlation peak to a reliability threshold at the derived symbol boundary.

21. The method as claimed in claim 20, comprising determining that the correlation peak is false and aborting decoding of the received signal if the energy of the correlation value at the derived symbol boundary is not sufficiently high compared to the reliability threshold.

22. The method of claim 20, comprising deriving the reliability threshold from an average energy of the received signal.

* * * * *